United States Patent
Wu

(10) Patent No.: US 10,429,668 B2
(45) Date of Patent: Oct. 1, 2019

(54) SCREWLESS EYEGLASSES FRAME

(71) Applicant: Chien-Liang Wu, Tainan (TW)

(72) Inventor: Chien-Liang Wu, Tainan (TW)

(*) Notice: Subject to any disclaimer, the term of this patent is extended or adjusted under 35 U.S.C. 154(b) by 0 days.

(21) Appl. No.: 15/864,349

(22) Filed: Jan. 8, 2018

(65) Prior Publication Data
US 2019/0212576 A1   Jul. 11, 2019

(51) Int. Cl.
*G02C 5/22* (2006.01)

(52) U.S. Cl.
CPC .................... *G02C 5/2209* (2013.01)

(58) Field of Classification Search
CPC ...... G02C 5/22; G02C 5/2209; G02C 5/2254; Y10T 16/526
USPC .................... 351/111, 116, 121, 153
See application file for complete search history.

(56) References Cited

U.S. PATENT DOCUMENTS

| | | | | |
|---|---|---|---|---|
| 5,898,471 A * | 4/1999 | Simioni | ............... | G02C 5/2209 16/228 |
| 9,983,417 B1 * | 5/2018 | Huang | .................. | G02C 5/2209 |
| 2011/0109872 A1 * | 5/2011 | Chen | ........................ | G02C 5/146 351/116 |
| 2012/0169990 A1 * | 7/2012 | Burnstein | ............ | A43B 1/0054 351/115 |
| 2014/0071396 A1 * | 3/2014 | Kuo | ..................... | G02C 5/2209 351/121 |
| 2016/0299352 A1 * | 10/2016 | Dai | ...................... | G02C 5/2209 |

FOREIGN PATENT DOCUMENTS

TW         M463361 U     10/2013

* cited by examiner

*Primary Examiner* — Darryl J Collins

(74) *Attorney, Agent, or Firm* — Muncy, Geissler, Olds & Lowe, P.C.

(57) ABSTRACT

A screwless eyeglasses frame includes a lens, a rim and two temples. The screwless eyeglasses frame further includes two first connecting portions respectively disposed at two ends of the rim, and two second connecting portions individually disposed at one end of each of the temples. Each of the first connecting portions includes a first body, an accommodating slot, a pivotal rotation channel, a sliding channel, and a positioning groove. Each of the second connecting portions includes a second body, a protruding block, a pivotal rotation axis and a sliding block. The pivotal rotation axis is able to sequentially enter the sliding channel, the pivotal rotation channel and the positioning groove. When the pivotal rotation axis is abutted against a lower end of the positioning groove, the second connecting portion is able to pivotally rotate correspondingly to the first connecting portion.

2 Claims, 9 Drawing Sheets

SCREWLESS EYEGLASSES FRAME

FIELD OF THE INVENTION

The present invention relates to a screwless eyeglasses frame, and particularly to a screwless eyeglasses frame having easy assembly and disassembly.

BACKGROUND OF THE INVENTION

In conventional eyeglasses, screws are generally used to fasten a rims and temples, and the strength for rotating the temples is adjusted by increasing or decreasing the fastening strength of the screws. The above configuration suffers from a drawback that, after collapsing and stretching the temples for multiple times for application, the screws may gradually become loose such that the temples cannot be securely connected to the rims, or the temples may arbitrarily dangle when without support. At this point, a user needs to again tighten the screws by tools, causing application inconveniences.

To solve the above issue, for example, the Taiwan Patent No. M463361 discloses eyeglasses with rims having an easy assembly, i.e., screwless eyeglasses are provided. In the above disclosure, a fastening member is primarily used and inserted into one end of the frame, two pivotal axes are formed on the fastening member, and the pivotal axes are pivotally connected into corresponding pivotal holes on a temple to allow the fastening member to pivotally rotate relative to the pivotal holes, achieving the object of bending the temples. As the pivotal axes and the pivotal holes can be configured with appropriate tightness, the issue of loosening of screws is solved. However, binding between the fastening member and the rim of the above connection method is extremely strong, and disengaging the rim from the temple can be quite difficult once the two are installed to each other. In the event of a damaged temple or a user wishes to change the style of the temple, the eyeglasses structure of the disclosure cannot meet such needs. Therefore, there is a need for a solution that overcomes the issues of the prior art.

SUMMARY OF THE INVENTION

It is an object of the present invention to resolve the issues of complicated assembling and disassembling processes of rims and temples of conventional screwless eyeglasses.

To achieve the above object, the present invention provides a screwless eyeglasses frame including a lens, a rim around an outer edge of the lens, and two temples respectively connected to two ends of the rim. Two sides of the lens are respectively defined as a front side and a back side. The screwless eyeglasses frame further includes two first connecting portions disposed at two opposite ends of the rim, and two second connecting portions individually disposed at one end of each of the temples. Each of the first connecting portions includes a first body disposed facing the back side of the lens, an accommodating slot recessed from the first body and being open towards the lens, a pivotal rotation channel in communication with the accommodating slot and being open towards the lens, a sliding channel disposed at one end of the pivotal rotation channel and being slantingly open towards the lens, and a positioning groove located at one end of the pivotal rotation channel away from the sliding channel. Each of the second connecting portions includes a second body, a protruding block extended outwards from the second body and disposed correspondingly to the accommodating slot, a pivotal rotation axis connected to the protruding block and disposed correspondingly to the pivotal rotation channel and the positioning groove, and a sliding block disposed at one end of the pivotal rotation axis, having a width greater than the radius of the pivotal rotation axes, and disposed correspondingly to the sliding channel. The pivotal rotation axis may sequentially enter the sliding channel, the pivotal rotation channel and the positioning groove. When the pivotal rotation axis is abutted against a lower end of the positioning groove, the second connecting portion is able to pivotally rotate correspondingly to the first connecting portion.

Further, each of the first connecting portions includes a guiding track in communication with the sliding channel. The guiding track has a width smaller than that of the accommodating slot, and is slantingly open from the sliding channel towards the lens.

Further, each of the positioning grooves and each of the pivotal rotation axes are in an engaging configuration.

Therefore, the present invention provides following effects compared to the prior art.

In the screwless eyeglasses frame of the present invention, since the slanting open position of each of the guiding tracks is slanting relative to the lens, the issue of loosening of each of the first connecting portions and each of the second connecting portions is eliminated when the eyeglasses are collapsed or stretched for application. Through a simple aligning operation, a user can disassemble the temples as desired, further achieving the object of replacing the temples according to user preferences.

DETAILED DESCRIPTION OF THE PREFERRED EMBODIMENTS

Figure 1:
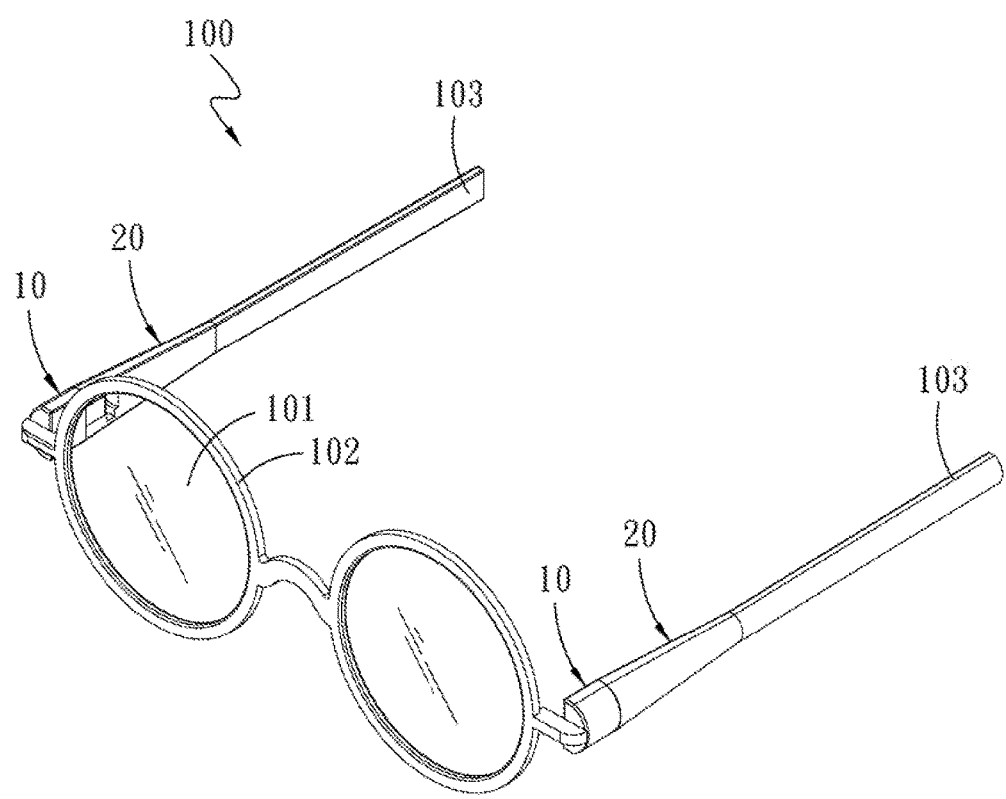
FIG. 1 is a perspective diagram of an eyeglasses structure with stretched temples of the present invention.
Figure 2:
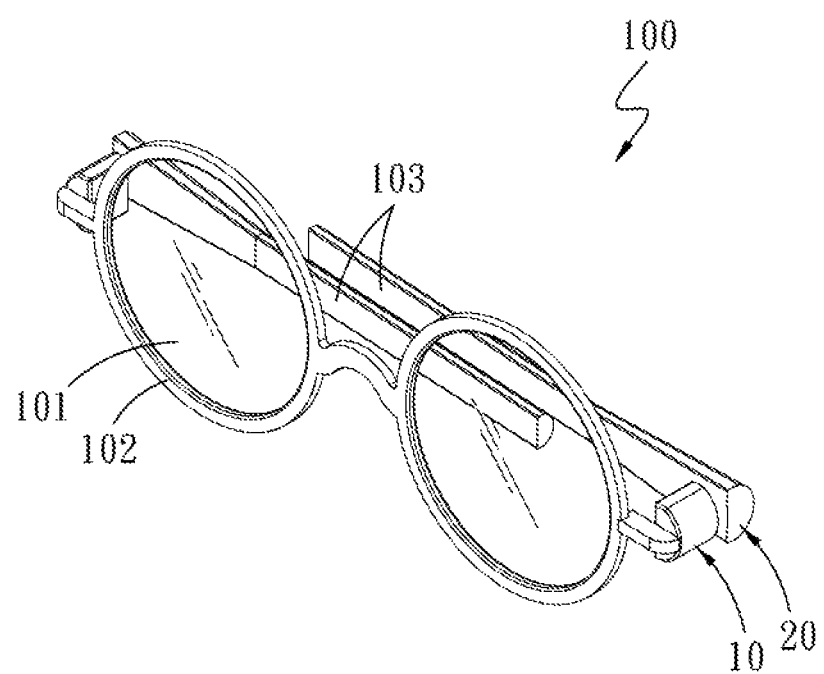
FIG. 2 is a perspective diagram of an eyeglasses structure with collapsed temples of the present invention.

Refer to FIG. 1 and FIG. 2 for technical contents of the present invention. The present invention provides a screwless eyeglasses frame 100, which may be, for example but not limited to, myopia eyeglasses (nearsightedness eyeglasses) or presbyopia eyeglasses (reading eyeglasses). The screwless eyeglasses frame 100 includes a lens 101, a rim 102 around an outer edge of the lens 101, and two temples 103 respectively connected to two ends of the rim 102. Two sides of the lens 101 are defined as a front side and a back side. In the application, the term "back side" refers to one side worn by a user when the user wears eyeglasses, and the term "front side" refers to a side facing the sight of the user when the user wears eyeglasses.

Figure 3:
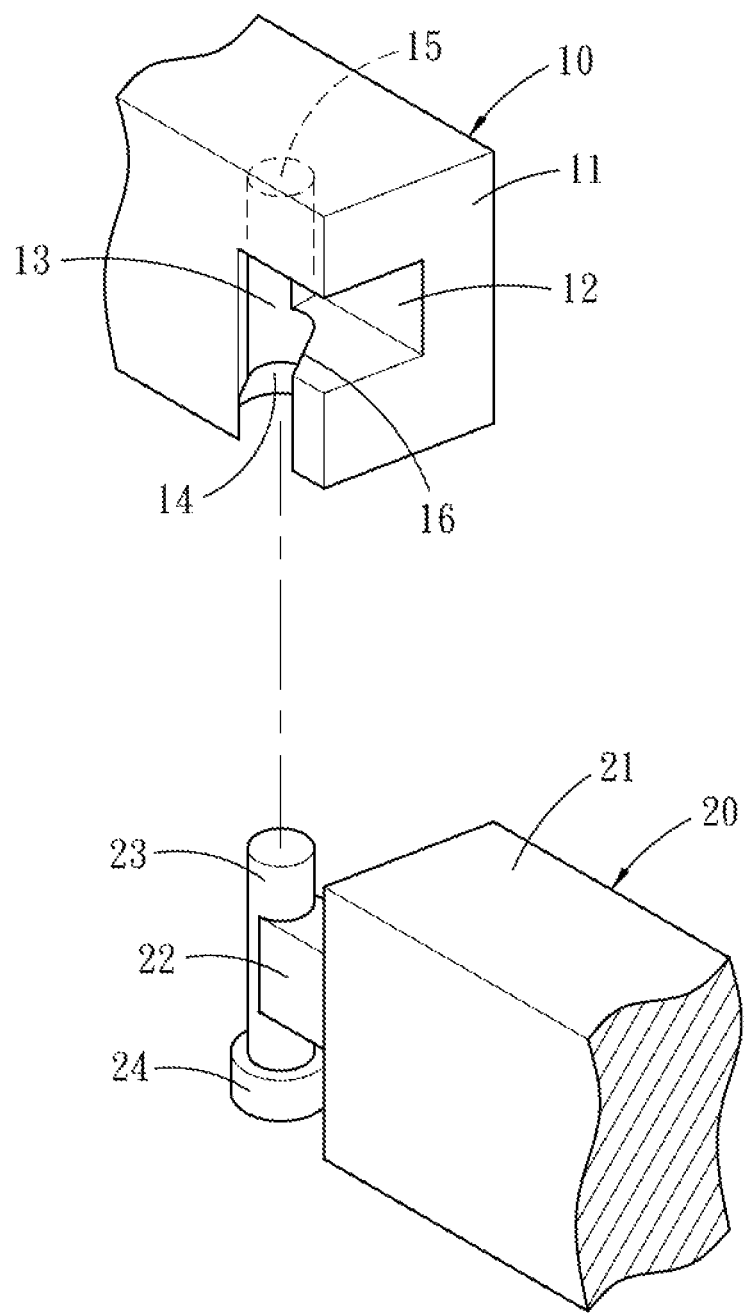
FIG. 3 is an exploded perspective diagram according to an embodiment of the present invention.
Figure 4A:
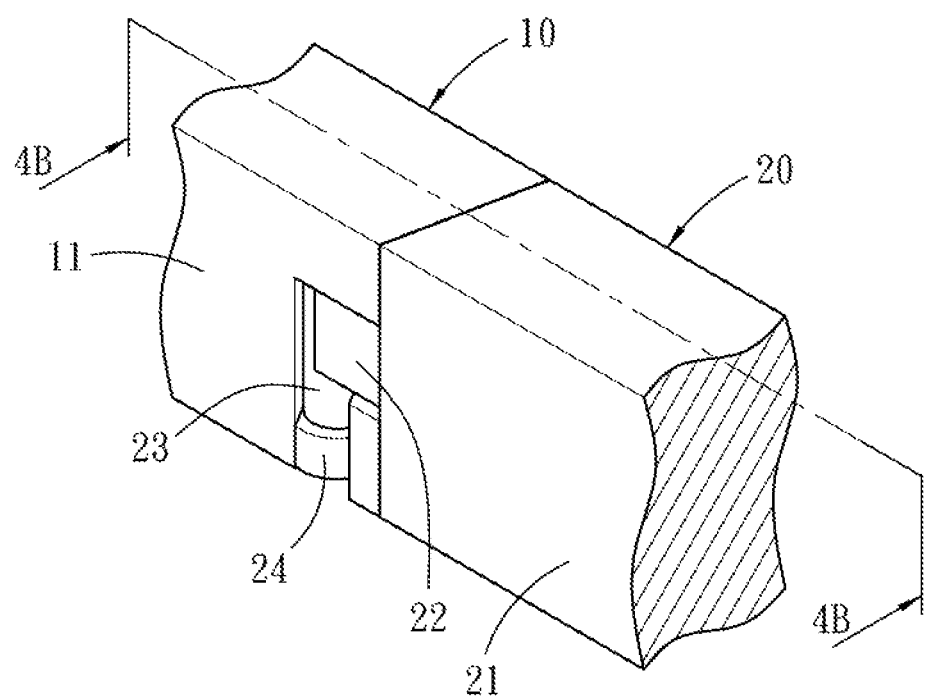
FIG. 4A is a perspective diagram of an assembly according to an embodiment of the present invention.
Figure 4B:
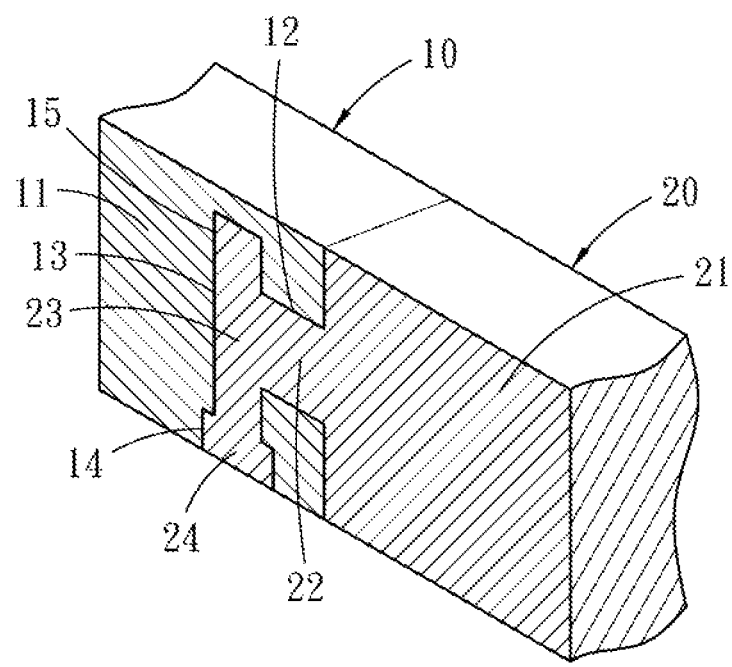
FIG. 4B is a section view of FIG. 4A along positions 4B-4B.
Figure 5:
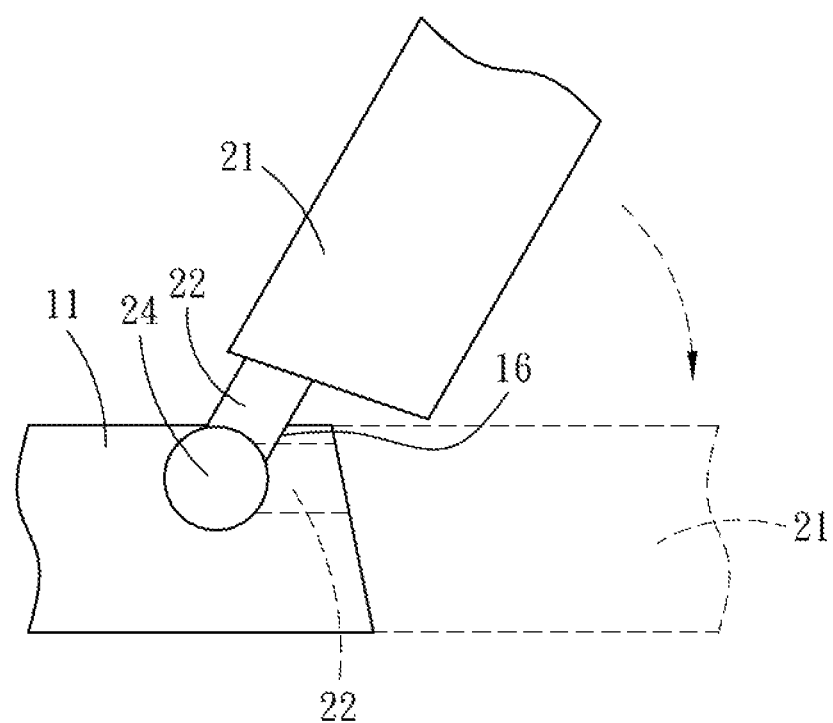
FIG. 5 is a schematic diagram of use according to an embodiment of the present invention.

Referring to FIG. 1, FIG. 2 and FIG. 3, the present invention provides a screwless eyeglasses frame 100 including a lens 101, a rim 102 around an outer edge of the lens 101, and two temples 103 respectively connected to two ends of the rim 102. Two sides of the lens 101 are defined as a front side and a back side. The screwless eyeglasses frame 100 is primarily divided into two parts—two first connecting portions 10 respectively disposed at two opposite ends of the rim 102, and two second connecting portions 20 individually disposed at one end of each of the temples 103.

More specifically, each of the first connecting portions 10 includes a first body 11 disposed facing the back side of the lens 101, an accommodating slot 12 recessed from the first body 11 and being open towards the lens 101, a pivotal rotation channel 13 in communication with the accommodating slot 12 and being open towards the lens 101, a sliding channel 14 disposed at one end of the pivotal rotation channel 13 and being slantingly open towards the lens 101, and a positioning groove 15 located at one end of the pivotal rotation channel 13 away from the sliding channel 14. In this embodiment, the accommodating slot 12 is open only towards the lens 101, and is for limiting a pivotal rotation angle of the second connecting portion 20 when connected to the second connecting portion 20. Each of the first connecting portions 10 further includes a guiding track 16 in communication with the sliding channel 14. The guiding track 16 has a width smaller than that of the accommodating slot 12, and is slantingly open from the sliding channel 14 towards the lens 101.

Each of the second connecting portions 20 includes a second body 21, a protruding block 22 extended outwards from the second body 21 and disposed correspondingly to the accommodating slot 12, a pivotal rotation axis 23 connected to the protruding block 22 and disposed correspondingly to the pivotal rotation channel 13 and the positioning groove 15, and the sliding block 24 disposed at one end of the pivotal rotation axis 23, having a width greater than the radius of the pivotal rotation axis 23, and disposed correspondingly to the sliding channel 14. In this embodiment, the pivotal rotation axis 23 is a cylindrical body, the sliding block 24 is a round disk wider and flatter than the pivotal rotation axis 23, and the pivotal rotation axis 23 and the sliding block 24 may be connected to the pivotal rotation channel 13 and the sliding channel 14 and then rotate.

Figure 6:
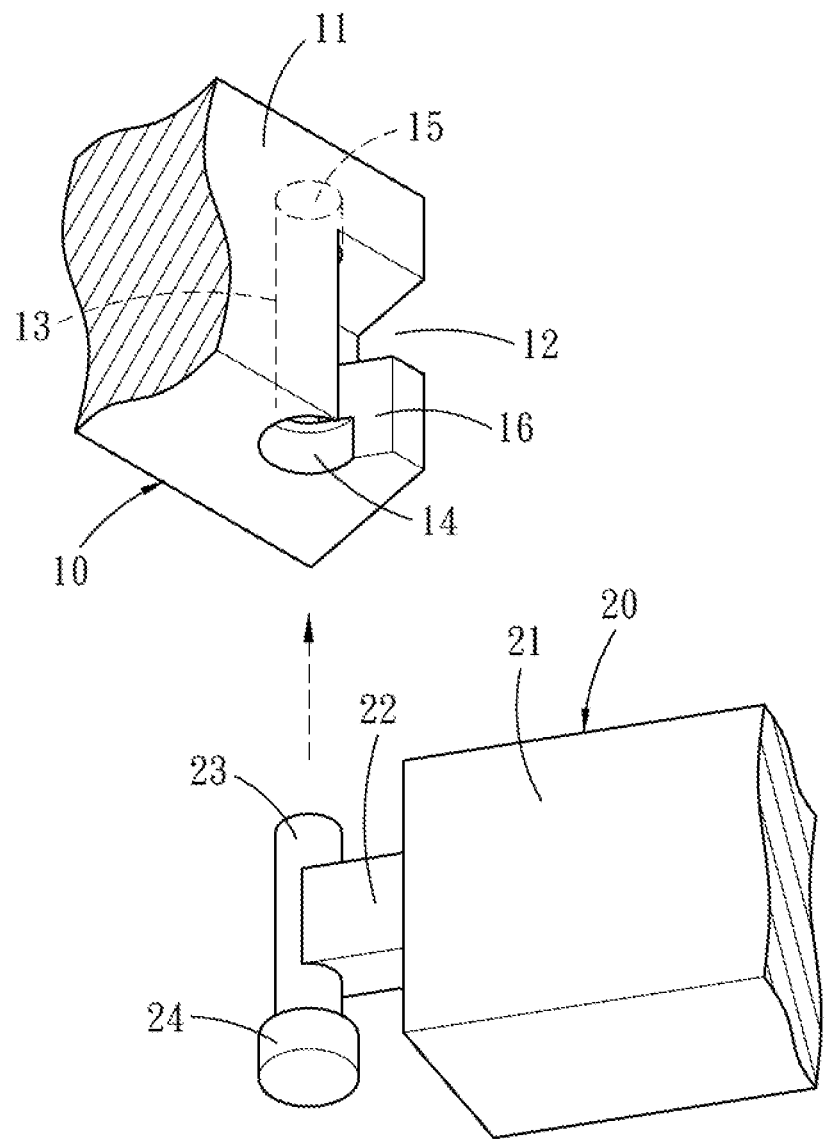
FIG. 6 is an exploded perspective diagram from another viewing angle according to an embodiment of the present invention.
Figure 7:
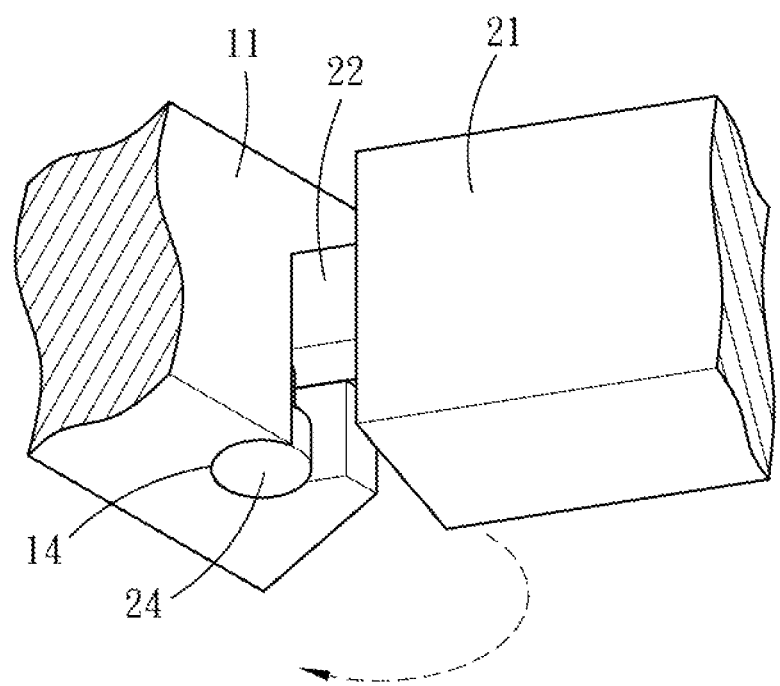
FIG. 7 and FIG. 8 are schematic diagrams of operations from another viewing angle according to an embodiment of the present invention.
Figure 8:
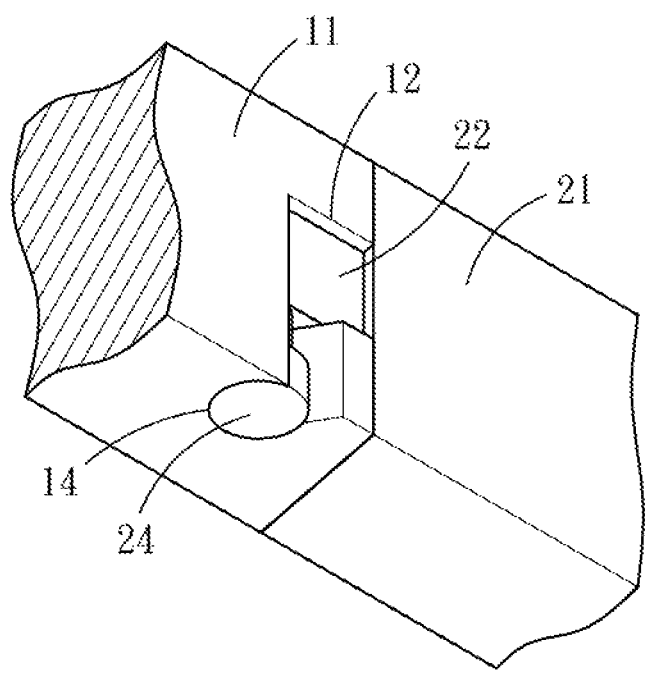

Details for assembling and disassembling the present invention are described below. Referring to FIG. 6, FIG. 7 and FIG. 8, because the guiding track 16 is slantingly open, the protruding block 22 can only pass through the guiding track 16 at a specific angle. That is, a user needs to align the protruding block 22 with the inclined angle of the guiding track 16 in order to insert the pivotal rotation axis 23 from a lower end (viewed from FIG. 6) sequentially into the sliding channel 14 and the pivotal rotation channel 13. The pivotal rotation axis 23 is eventually positioned at the positioning groove 15. The sliding block 24 is stopped at the pivotal rotation channel 13 because the sliding block 24 has a larger width than the pivotal rotation channel 13. After the assembling as above, the protruding block 22 is rotated and placed against the accommodating slot 12. At this point, since the width of the guiding track 16 is smaller than that of the accommodating slot 12, the protruding block 22 is unable to slide out from the guiding track 16 after the protruding block 22 enters the accommodating slot 12. Therefore, the second connecting portion 20 does not entirely separate from the first connecting portion 10 as the protruding block 22 is limited by the guiding track 16. In this embodiment, each of the positioning grooves 15 and the each of the pivotal rotation axes 23 may be in an engaging configuration to reinforce the binding force between the two. When the pivotal rotation axis 23 is abutted against a lower end of the positioning groove 15, both of the sliding block 24 and the pivotal rotation axis 23 are capable of rotating in the sliding channel 14 and the pivotal rotation channel 13, such that the second connecting portion 20 is able to correspondingly pivotally rotate correspondingly to the first connecting portion 10, achieving the object of disassembling or assembling the temple 103 without any assistance of tools.

With the above structure, in the screwless eyeglasses frame 100 of the present invention, since the slanting open position of each of the guiding tracks 16 is slanting relative to the lens 101, the issue of loosening of each of the first connecting portions 10 and each of the second connecting portions 20 is eliminated when the eyeglasses are collapsed or stretched for application (as the state shown in FIG. 1 or FIG. 2). Through a simple aligning operation, a user can disassemble the temples 103 as desired, further achieving the object of replacing the temples 103 according to user preferences.

What is claimed is:

1. A screwless eyeglasses frame, comprising a lens, a rim around an outer edge of the lens, and two temples respectively connected to two ends of the rim, two sides of the lens being defined as a front side and a back side, wherein the screwless eyeglasses frame further comprises:

two first connecting portions respectively disposed at two opposite ends of the rim, each of the first connecting portions comprising a first body disposed facing the back side of the lens, an accommodating slot recessed from the first body and being open towards the lens, a pivotal rotation channel in communication with the accommodating slot and being open towards the lens, a sliding channel disposed at one end of the pivotal rotation channel and being slantingly open towards the lens, a positioning groove located at one end of the pivotal rotation channel away from the sliding channel, and a guiding track in communication with the sliding channel, wherein the guiding track has a width smaller than that of the accommodating slot, and is slantingly open from the sliding channel towards the lens; and two second connecting portions individually disposed at one end of each of the temples, each of the second connecting portions comprising a second body, a protruding block extended outwards from the second body and disposed correspondingly to the accommodating slot, a pivotal rotation axis connected to the protruding block and disposed correspondingly to the pivotal rotation channel and the positioning groove, and a sliding block disposed at one end of the pivotal rotation axis, having a width greater than a radius of the pivotal rotation axis and disposed correspondingly to the sliding channel;

wherein the pivotal rotation axis is able to sequentially enter the sliding channel, the pivotal rotation channel and the positioning groove, and the second connecting portion is able to pivotally rotate correspondingly to the first connecting portion when the pivotal rotation axis is abutted against a lower end of the positioning groove.

2. The screwless eyeglasses frame of claim 1, wherein each of the positioning grooves and each of the pivotal rotation axes are in an engaging configuration.

\* \* \* \* \*